(12) United States Patent
Shpeisman et al.

(10) Patent No.: US 7,216,137 B2
(45) Date of Patent: May 8, 2007

(54) METHOD FOR PROVIDING GARBAGE COLLECTION SUPPORT

(75) Inventors: Tatiana Shpeisman, Menlo Park, CA (US); Guei-Yuan Lueh, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1253 days.

(21) Appl. No.: 10/016,291

(22) Filed: Oct. 30, 2001

(65) Prior Publication Data

US 2003/0084077 A1     May 1, 2003

(51) Int. Cl.
*G06F 17/30* (2006.01)

(52) U.S. Cl. ....................... 707/206; 707/205

(58) Field of Classification Search .......... 707/3, 707/7, 101, 102, 107, 103 R, 206, 205; 709/203, 709/218, 231; 710/200; 717/126, 136, 139, 717/156, 175; 712/34

See application file for complete search history.

(56) References Cited

U.S. PATENT DOCUMENTS 6,691,306 B1 *  2/2004  Cohen et al. ............... 717/139
6,718,539 B1 *  4/2004  Cohen et al. ............... 717/136

OTHER PUBLICATIONS

Luc Moreau, Distributed Computations Driven by Resource Consumption, pp. 1-10.*

* cited by examiner

*Primary Examiner*—Apu M. Mofiz
(74) *Attorney, Agent, or Firm*—Blakely, Sokoloff, Taylor & Zafman LLP

(57) ABSTRACT

An improved method for compiler support of garbage collection. Live reference data to support a garbage collection process are stored in null operation instructions (NOPs) of an instruction set within the native code. This allows the live reference information to be encoded near the call instruction and thus the information can be retrieved in constant time. This may decease the amount of processing resources required for garbage collection.

The compiler determines which references are live at each call. The compiler may also determine the number of bits that may be used to store those references. In one embodiment the number of NOPs is sufficient to store the information. In an alternative embodiment, NOPs are artificially inserted to store the information. Because a sufficient number of NOPs are typically present anyway, the method of one embodiment of the present invention does not significantly increase the size of the code.

24 Claims, 4 Drawing Sheets

METHOD FOR PROVIDING GARBAGE COLLECTION SUPPORT

FIELD OF THE INVENTION

This invention relates generally to computing system memory management, and more specifically, to an efficient method for providing garbage collection support.

BACKGROUND OF THE INVENTION

The random access memory (RAM) of a computing system is typically a fixed-size resource. The RAM must be managed properly to maintain system performance. In runtime environments (e.g., JAVA) the memory management is handled by the system. Memory management includes a process known as garbage collection, which is a process of recycling memory. When a computing program is running it allocates and uses portions of memory on an on-going basis. At some point the program may no longer need to use a particular portion of memory, for example, the memory was allocated for a particular purpose that is no longer relevant. The portions that are no longer being used (garbage) are identified (collected) so that they can be recycled for future use. When garbage collection begins, the garbage collection algorithm must determine all live objects. That is, the garbage collection process marks all objects that are currently being used by the program (live references) and all other objects are considered garbage. The garbage collector (GC) relies on the system compiler to provide a live reference enumeration root set, i.e., live reference information. To provide this information to the GC, the compiler must keep track of which objects should be added to, or deleted from, the live reference information. The live reference information is constantly changing because at different points of program execution some objects are being created and some are no longer used. Typically garbage collection occurs at the time of a function call (call) that requests new memory. A function call passes control to a subroutine and after the subroutine is executed, control returns to the next instruction in the main program. Therefore, to provide the live reference information to the GC, the compiler should be able to determine the live references at each call site. Typically, the compiler stores the live reference information by keeping a list of call sites with corresponding live reference information for each call site stored somewhere in memory. At compilation time, the compiler generates native code to be executed by the computing system and also stores a garbage collection map.

FIG. 1 illustrates a typical storage scheme for live reference information in accordance with the prior art. System 100, shown in FIG. 1, includes native code storage 105 and garbage collection information storage 110. Garbage collection information storage 110 includes method garbage collection information storage 111 that contains a list of all variables for the program and live reference information storage 112. The program contained in native code section 105 consists of a set of instructions, some of which are calls. When the program is being executed and a request for new memory is made (e.g., at a call), the GC inquires of the compiler for a list of live references at that point in the program. So, for example, native code storage 105 contains calls A, B, and C. When garbage collection takes place at one of these calls, the address of the call site at which garbage collection happened is provided to the compiler. The compiler must then go to live reference information storage 112 of garbage collection information storage 110 and traverse the list until the specific address is found. That is, the compiler has to search through the list of all call sites until it finds the one where garbage collection has occurred. At this point the GC has access to the live reference information to perform the garbage collection function.

Storing this information separately taxes the system's processing resources because the live reference information is obtained through a search of what may be a large list. The size of the list depends upon the number of calls in the method. Typically, the list may be indexed to reduce the information access time.

BRIEF DESCRIPTION OF THE DRAWINGS

The present invention is illustrated by way of example, and not limitation, by the figures of the accompanying drawings in which like references indicate similar elements and in which.

DETAILED DESCRIPTION

An improved method for compiler support of garbage collection is described. A runtime computing system may contain null operation instructions (NOPs) that contain a data field that is ignored by the hardware. For example, Intel Corporation's IA-64 architecture specifies that instructions be placed in groups of three instructions called bundles. The architecture also specifies which instructions may be bundled together. Empty slots within a bundle caused by the architecture specifications are filled with NOPs. In one embodiment, the NOPs are used to store the live reference data used by the GC. This allows the live reference information to be encoded right after the call instruction and thus the information can be retrieved in constant time. During compilation, the compiler knows which references are live at each call. The compiler may also determine the number of bits that may be used to store those references. In one embodiment the number of NOPs is sufficient to store the information. In an alternative embodiment, NOPs are artificially inserted to store the information.

Figure 1:
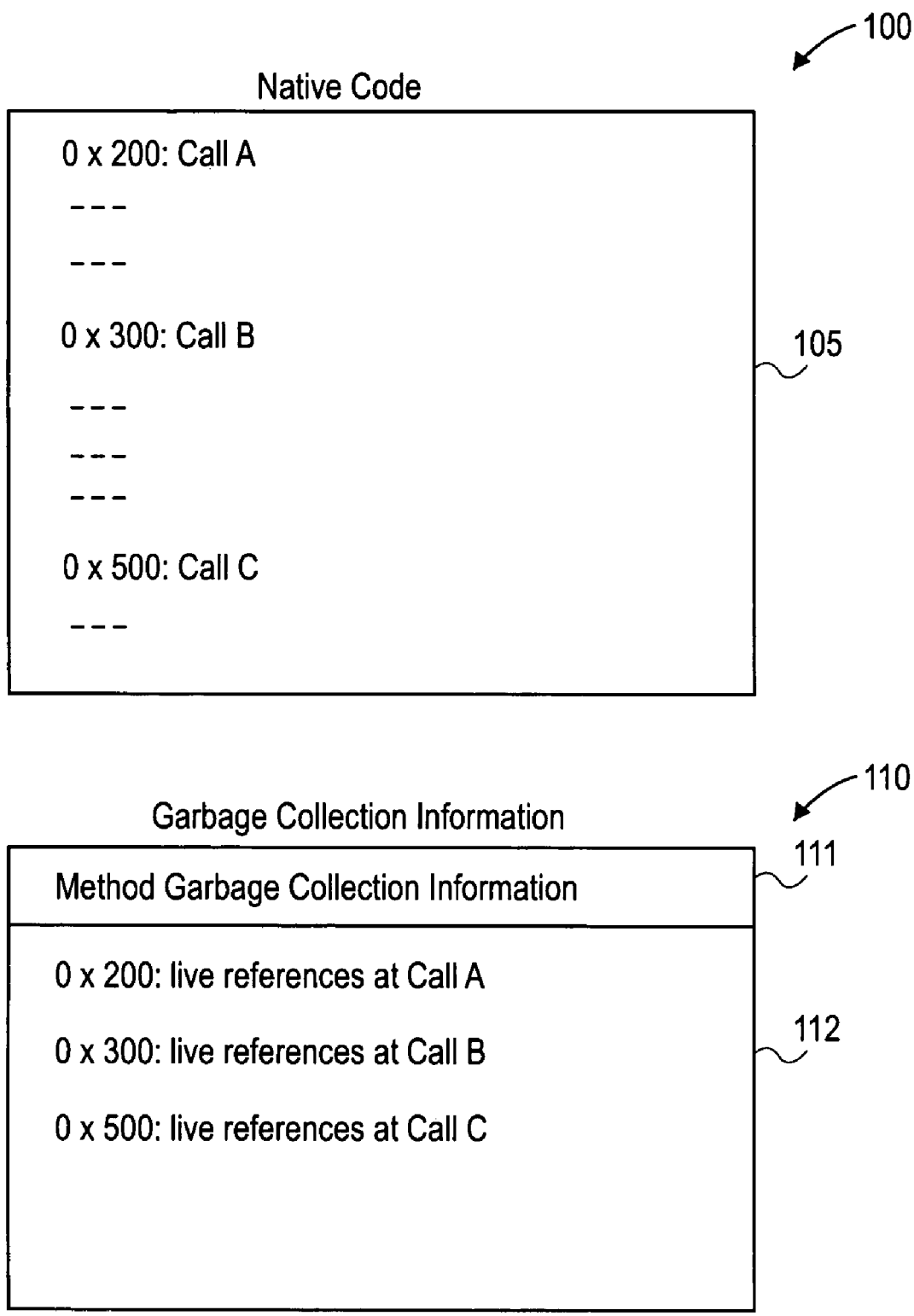
FIG. 1 illustrates a typical storage scheme for live reference information in accordance with the prior art.
Figure 2:
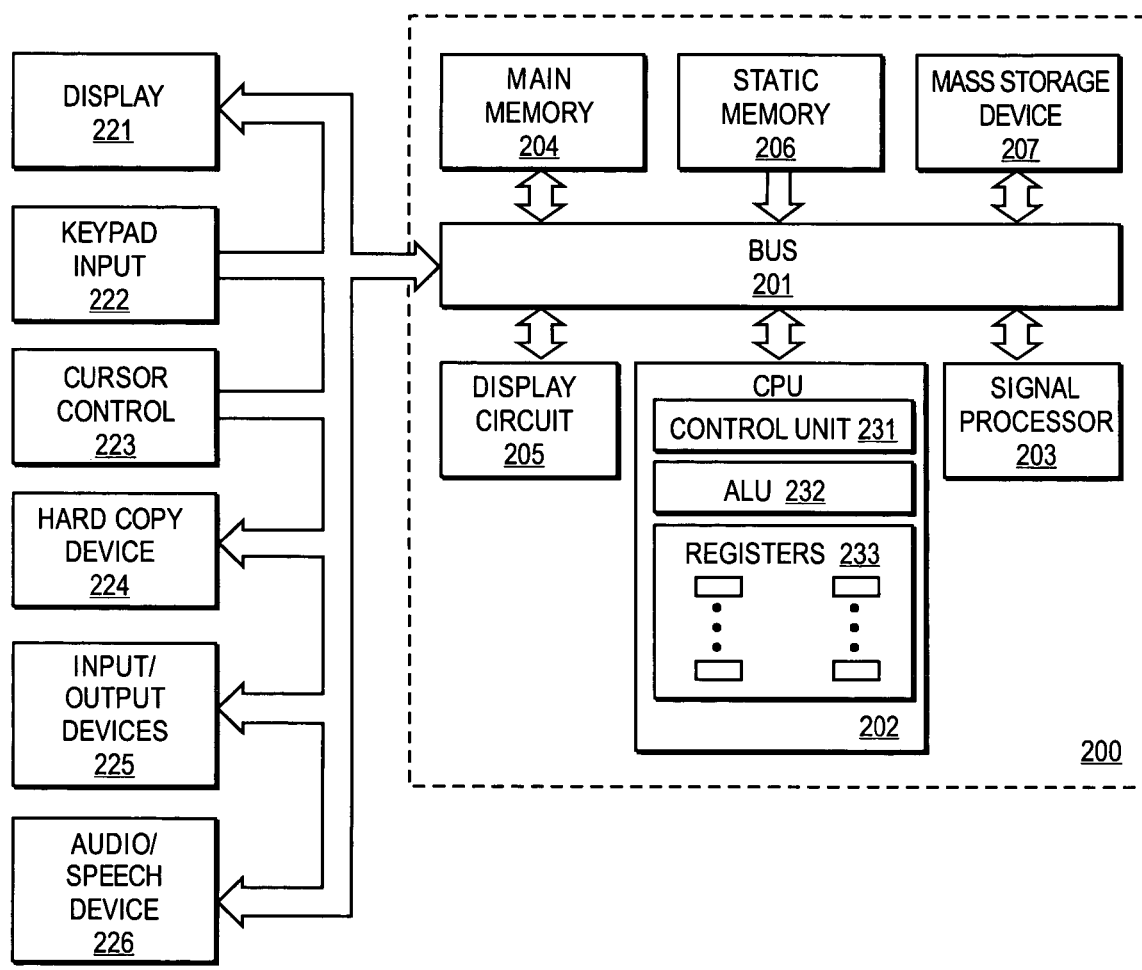
FIG. 2 is a diagram illustrating an exemplary computing system 200 for implementing compiler support for garbage collection in accordance with the present invention.

FIG. 2 is a diagram illustrating an exemplary computing system 200 for implementing compiler support for garbage collection in accordance with the present invention. The live reference data generation, data storage calculations, NOP insertions, and information recordation described herein can be implemented and utilized within computing system 200, which can represent a general-purpose computer, portable computer, or other like device. The components of computing system 200 are exemplary in which one or more components can be omitted or added. For example, one or more memory devices can be utilized for computing system 200.

Referring to FIG. 2, computing system 200 includes a central processing unit 202 and a signal processor 203 coupled to a display circuit 205, main memory 204, static memory 206, and mass storage device 207 via bus 201. Computing system 200 can also be coupled to a display 221, keypad input 222, cursor control 223, hard copy device 224, input/output (I/O) devices 225, and audio/speech device 226 via bus 201.

Bus 201 is a standard system bus for communicating information and signals. CPU 202 and signal processor 203 are processing units for computing system 200. CPU 202 or signal processor 203 or both can be used to process information and/or signals for computing system 200. CPU 202 includes a control unit 231, an arithmetic logic unit (ALU) 232, and several registers 233, which are used to process information and signals. Signal processor 203 can also include similar components as CPU 202.

Main memory 204 can be, e.g., a random access memory (RAM) or some other dynamic storage device, for storing information or instructions (program code), which are used by CPU 202 or signal processor 203. Main memory 204 may store temporary variables or other intermediate information during execution of instructions by CPU 202 or signal processor 203. Static memory 206, can be, e.g., a read only memory (ROM) and/or other static storage devices, for storing information or instructions, which can also be used by CPU 202 or signal processor 203. Mass storage device 207 can be, e.g., a hard or floppy disk drive or optical disk drive, for storing information or instructions for computing system 200.

Display 221 can be, e.g., a cathode ray tube (CRT) or liquid crystal display (LCD). Display device 221 displays information or graphics to a user. Computing system 200 can interface with display 221 via display circuit 205. Keypad input 222 is a alphanumeric input device with an analog to digital converter. Cursor control 223 can be, e.g., a mouse, a trackball, or cursor direction keys, for controlling movement of an object on display 221. Hard copy device 224 can be, e.g., a laser printer, for printing information on paper, film, or some other like medium. A number of input/output devices 225 can be coupled to computing system 200. Compiler support for garbage collection in accordance with the present invention can be implemented by hardware and/or software contained within computing system 200. For example, CPU 202 or signal processor 203 can execute code or instructions stored in a machine-readable medium, e.g., main memory 204.

The machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions may be represented by carrier-wave signals, infrared signals, digital signals, and by other like signals.

Figure 3:
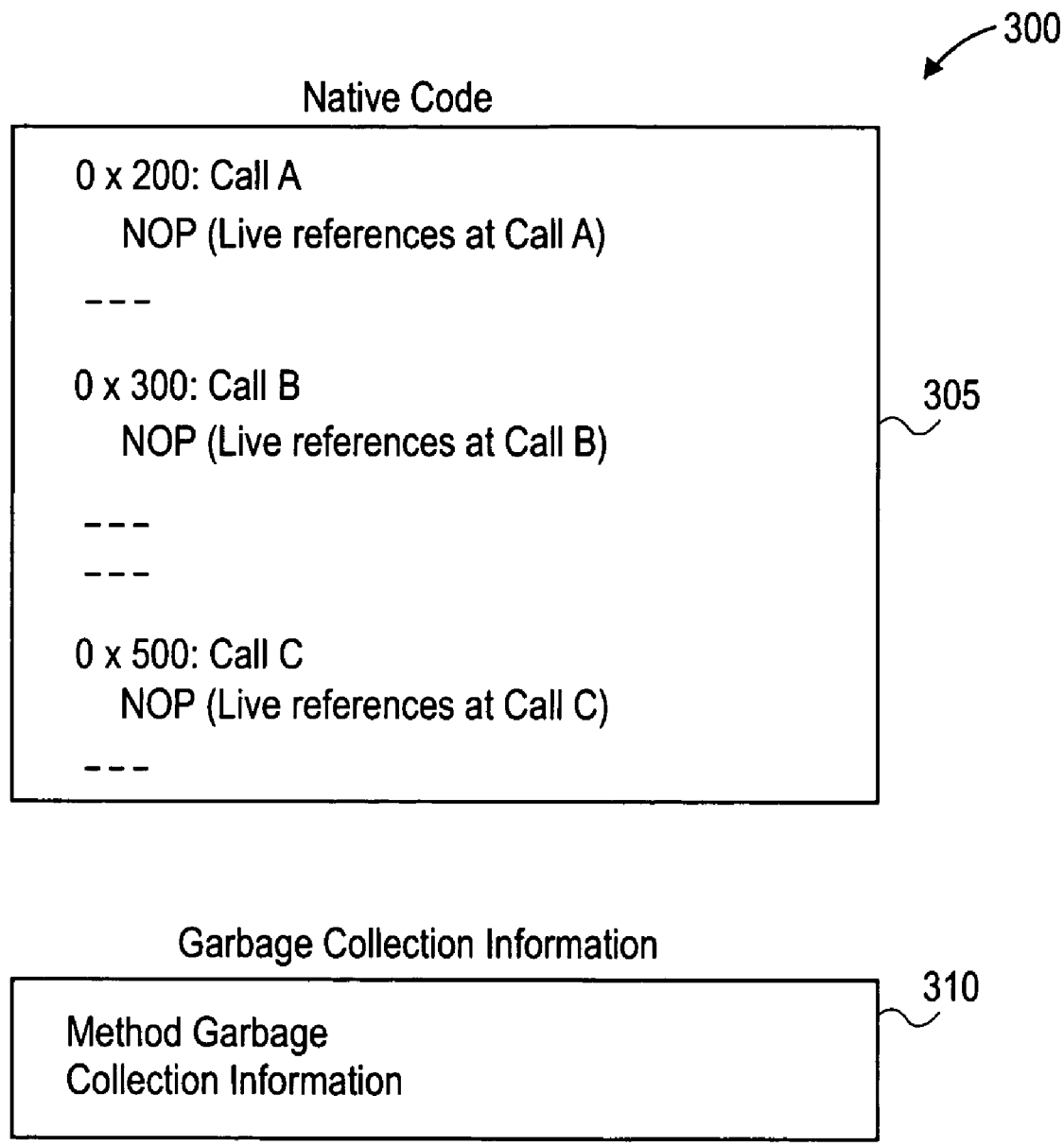
FIG. 3 illustrates a storage scheme for live reference information in accordance with the one embodiment of the present invention.

FIG. 3 illustrates a storage scheme for live reference information in accordance with the one embodiment of the present invention. The system 300, shown in FIG. 3, includes native code 305 containing, among other code, NOPs that store the live references information pertaining to each call in the program.

System 300 also contains garbage collection information 310, which is a list of all the variables in the program that contain live references during some point of program execution. In one embodiment the live references are reported by a number corresponding to the list contained in the garbage collection information 310. For a program with four variables A, B, C, and D, the variables that are alive at a given call may be represented by a four-bit number. Only one such mapping of variables to numbers is required per method. When live variables are reported, the bit vector may be used with 1s (ones) in positions to correspond to live variables. For example if variables A, B, and D are live, at a given call, this fact may be represented by 1101 where a 1 (one) indicates the variable is alive and a 0 (zero) indicates the variable is not alive. This is in contrast to encoding the actual register for each reference, which for systems having 128 registers, for example, would require seven bits to store each live reference.

Using such bit-vector representation, and a NOP having a 21-bit field allows reporting on up to 21 objects using one NOP. This saves storage space because in some typical architectures, up to one third of the instructions are NOPs.

Figure 4:
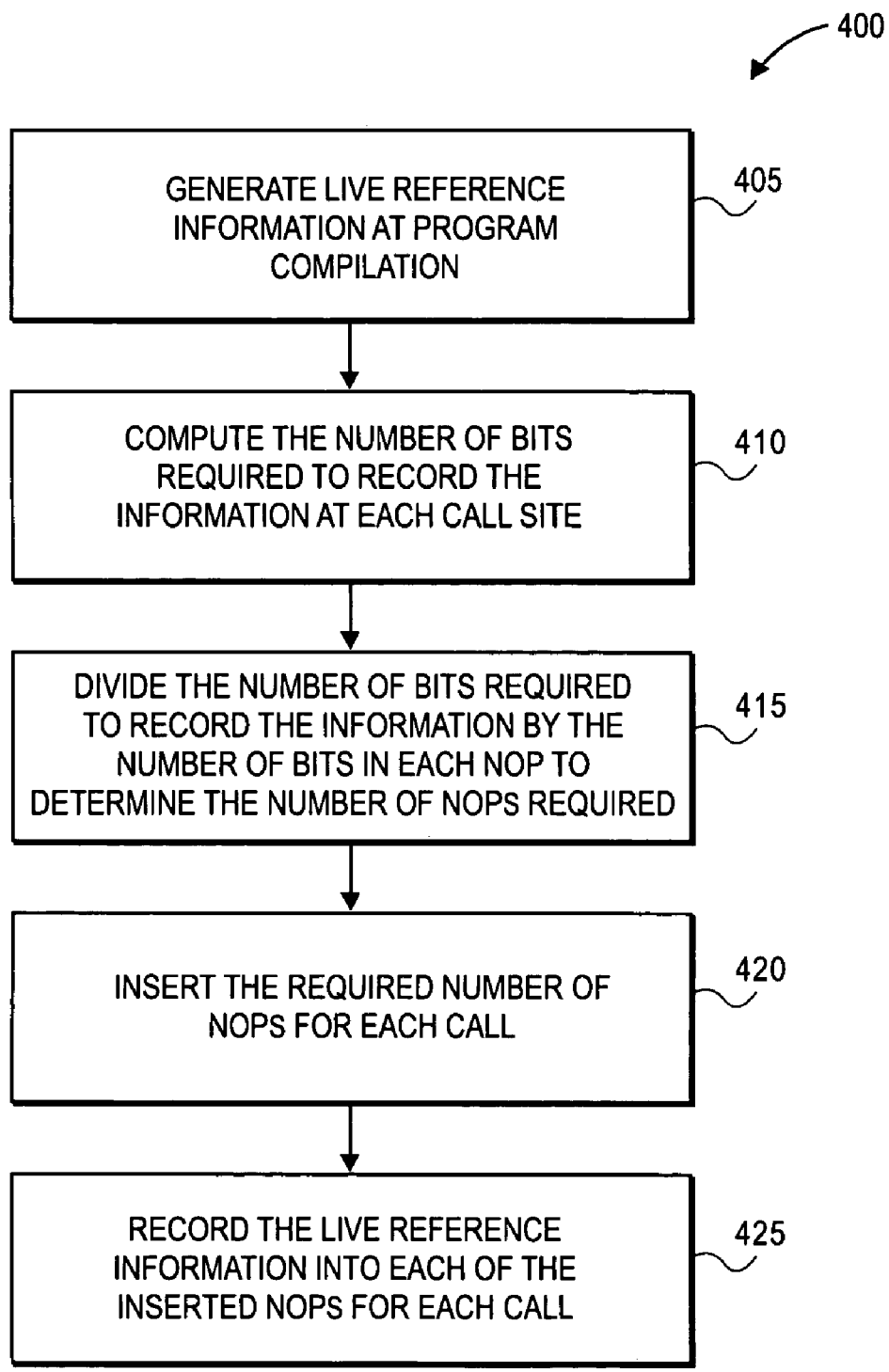
FIG. 4 is a process flow diagram in accordance with one embodiment of the present invention.

FIG. 4 is a process flow diagram in accordance with one embodiment of the present invention. Process 400, shown in FIG. 4, begins with operation 405 in which the compiler generates live reference information. At operation 410, the number of bits required to record the live reference information is computed for each call site. For a given method, this number may be equal to the number of registers and stack location used by the method that may contain references as discussed above.

At operation 415, the number of NOP instructions required to store the live reference information is determined by dividing the number of bits calculated at operation 410 (equal to possible references of the metheod) by the number of bits in the NOP. For some architectures a NOP may contain a 21-bit field. Therefore, for methods with up to 21 registers and stack locations that may contain references, only one NOP is required. Empirically it is found that for a majority of programs one NOP is sufficient. Two NOPs may be required in rare cases (i.e., those having more than 21 and up to 42 possible references). For a system architecture having 128 registers, the theoretical maximum number of NOPs required would be seven.

At operation 420 the required number of NOPs, as determined at operation 415, are inserted before each call. This may be done in alternative ways including either prior to, or during, templatization (the process of grouping instructions into bundles). As discussed above, instructions are grouped into bundles of three instructions. Due to a set of restriction as to which instructions may be bundled together, approximately one third of all instructions are NOPs. In one embodiment the required NOPs are inserted prior to templatization. Prior to templatization the list of useful instructions is reviewed and an appropriate number of NOPs are inserted just before each call instruction. In most cases this will be just one NOP instruction. Because there was likely to have been at least one NOP inserted anyway, due to bundling restrictions, the overall size of the bundled code is not increased significantly. In an alternative embodiment, the bundled instructions are reviewed to determine if NOPs are available where necessary (i.e., prior to a call). In those places where a NOP is required, but does not happen to be available, a NOP is inserted. Typically no more than one NOP will need to be inserted.

The live reference information is then recorded into each of the inserted NOPs at operation 425. These may be NOPs that were specifically inserted prior to templatization, or NOPs that occurred during the templatization process. In any case, a sufficient number of NOPs is available so that the live references information for each call may be inserted. When garbage collection occurs, the method garbage collection information 310 is read to indicate how many instructions were used to record the live reference information. The required number of instructions are then passed with the call and the live reference information for the call is obtained by the GC.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A computer implemented method comprising:
   inserting at least one null operation instruction in an instruction set; and
   recording live reference information for a garbage collection process within a data field of the null operation instruction; and
   forwarding a request for new memory and the live reference information to a compiler concurrently.

2. The method of claim 1 wherein the instruction set is an instruction set of a run-time system.

3. The method of claim 2 wherein the run-time system is a Java virtual machine.

4. The method of claim 3 wherein the number of null operation instructions inserted into the instruction set is determined by dividing a number of bits required to record the live reference information by a number of bits used as a data field in each null operation instruction.

5. A computer implemented method comprising:
   determining at least one instruction of an instruction set to be a null operation instruction; and
   recording live reference information for a garbage collection process within a data field of the null operation instruction; and
   forwarding a request for new memory and the live reference information to a compiler concurrently.

6. The method of claim 5 wherein the instruction set is an instruction set of a run-time system.

7. The method of claim 6 wherein the run-time system is a Java Virtual Machine.

8. The method of claim 7 further comprising:
   determining the number of null operation instructions available to be insufficient to record the live reference information; and
   inserting at least one null operation instruction such that the number of null operation instructions is sufficient to record the live reference information.

9. A computer implemented apparatus comprising:
   a memory to store an instruction set, the instruction set having at least one null operation instruction inserted therein; and
   a compiler to record live reference information for a garbage collection process within a data field of the null operation instruction.

10. The apparatus of claim 9 wherein the instruction set is an instruction set of a run-time system.

11. The apparatus of claim 10 wherein the run-time system is a Java virtual machine.

12. The apparatus of claim 11 wherein the number of null operation instructions inserted into the instruction set is determined by dividing a number of bits required to record the live reference information by a number of bits used as a data field in each null operation instruction.

13. A computer implemented apparatus comprising:
    a memory to store an instruction set;
    a processor to determine at least one instruction of the instruction set to be a null operation instruction; and
    a compiler to record live reference information for a garbage collection process within a data field of the null operation instruction.

14. The apparatus of claim 13 wherein the instruction set is an instruction set of a run-time system.

15. The apparatus of claim 14 wherein the run-time system is a Java virtual Machine.

16. The apparatus of claim 15 wherein the processor is further used to insert at least one null operation instruction upon determining the number of null operation instructions available to be insufficient to record the live reference information such that the number of null operation instructions is sufficient to record the live reference information.

17. A machine-readable medium that provides executable instructions which, when executed by a processor, cause the processor to perform a method, the method comprising:
    inserting at least one null operation instruction in an instruction set; and
    recording live reference information for a garbage collection process within a data field of the null operation instruction; and
    forwarding a request for new memory and the live reference information to a compiler concurrently.

18. The machine-readable medium of claim 17 wherein the instruction set is an instruction set of a run-time system.

19. The machine-readable medium of claim 18 wherein the run-time system is a Java virtual machine.

20. The machine-readable medium of claim 19 wherein the number of null operation instructions inserted into the instruction set is determined by dividing a number of bits required to record the live reference information by a number of bits used as a data field in each null operation instruction.

21. A machine-readable medium that provides executable instructions which, when executed by a processor, cause the processor to perform a method, the method comprising:
    determining at least one instruction of an instruction set to be a null operation instruction; and
    recording live reference information for a garbage collection process within a data field of the null operation instruction; and
    forwarding a request for new memory and the live reference information to a compiler concurrently.

22. The machine-readable medium of claim 21 wherein the instruction set is an instruction set of a run-time system.

23. The machine-readable medium of claim 22 wherein the run-time system is a Java virtual Machine.

24. The machine-readable medium of claim 23 wherein the method further comprises:
    determining the number of null operation instructions available to be insufficient to record the live reference information; and
    inserting at least one null operation instruction such that the number of null operation instructions is sufficient to record the live reference information.

* * * * *

UNITED STATES PATENT AND TRADEMARK OFFICE
CERTIFICATE OF CORRECTION

PATENT NO. : 7,216,137 B2 Page 1 of 1
APPLICATION NO. : 10/016291
DATED : May 8, 2007
INVENTOR(S) : Shpeisman et al.

It is certified that error appears in the above-identified patent and that said Letters Patent is hereby corrected as shown below:

In column 4, at line 25, delete "metheod" and insert --method--.

Signed and Sealed this

Twenty-seventh Day of January, 2009

JOHN DOLL
*Acting Director of the United States Patent and Trademark Office*